United States Patent [19]

Ohsawa et al.

[11] Patent Number: 5,109,305
[45] Date of Patent: Apr. 28, 1992

[54] FOUR HEAD SEQUENTIAL SWITCH SCANNING TYPE MAGNETIC RECORDING/REPRODUCING APPARATUS

[75] Inventors: Atsuo Ohsawa; Shigeyuki Itoh; Nobuyuki Kaku, all of Yokohama, Japan

[73] Assignee: Hitachi, Ltd., Tokyo, Japan

[21] Appl. No.: 609,104

[22] Filed: Nov. 5, 1990

Related U.S. Application Data

[63] Continuation of Ser. No. 478,713, Feb. 8, 1990, abandoned, which is a continuation of Ser. No. 61,312, Jun. 12, 1987, abandoned.

[30] Foreign Application Priority Data

Jun. 14, 1986 [JP] Japan .............. 61-137289

[51] Int. Cl.$^5$ ............................................ H04N 5/782
[52] U.S. Cl. ..................................... 360/64; 358/335; 360/70; 360/77.15
[58] Field of Search ................ 360/70, 75, 84, 10.1, 360/19.1, 27, 32, 77.15, 10.2, 64, 73.04, 73.09, 73.11, 73.12, 73.14, 77.12–77.14; 358/335

[56] References Cited

U.S. PATENT DOCUMENTS

| | | | |
|---|---|---|---|
| 4,520,405 | 5/1985 | Sasaki et al. | 360/10.3 |
| 4,563,714 | 1/1986 | Takeuchi | 360/77 |
| 4,568,986 | 2/1986 | Furahata et al. | 360/10.1 X |
| 4,581,658 | 4/1986 | Azama et al. | 360/10.1 X |
| 4,587,580 | 3/1986 | Takayama et al. | 360/77 |
| 4,607,298 | 8/1986 | Yamashita | 360/77 X |
| 4,683,503 | 7/1987 | Takimoto | 360/64 |
| 4,686,589 | 8/1987 | Takimoto | 360/77 |
| 4,769,722 | 9/1988 | Itoh et al. | 360/32 X |
| 4,897,739 | 1/1990 | Hasegawa et al. | 360/64 |
| 4,916,554 | 4/1990 | Takahashi et al. | 360/77.15 X |

Primary Examiner—Roy N. Envall, Jr.
Assistant Examiner—W. R. Young
Attorney, Agent, or Firm—Antonelli, Terry, Stout & Kraus

[57] ABSTRACT

Four heads are mounted with 90° spacings between them to a rotary cylinder that rotates by ¾ turn in each one field period of a video signal. Adjacent pairs of these heads having the 90° spacing have different azimuth angles while opposing pairs of the heads having the 180° spacing have mutually the same azimuth angle. A tape is wound helically in about ¾ turn on the rotary cylinder and travelled thereon, so that the frequency of a pilot signal for tracking control to be recorded on each track with a video signal by each head is different between the tracks and the same frequency as the frequency of the pilot signal reproduced from the reproduction track in the reproducing mode is used as a reference pilot signal for tracking in the reproducing mode.

13 Claims, 9 Drawing Sheets

FIG. 2(a) Tp
FIG. 2(b) Tp'
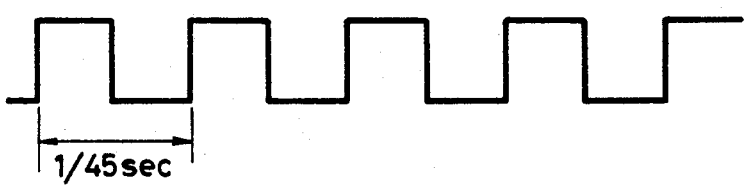
1/45 sec
FIG. 2(c) P30
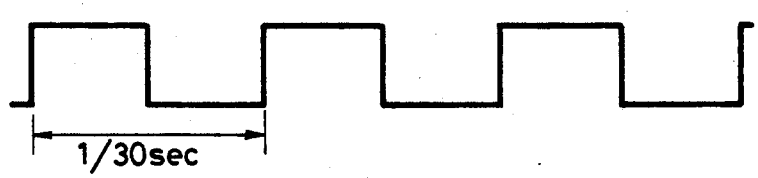
1/30 sec
FIG. 2(d) P15
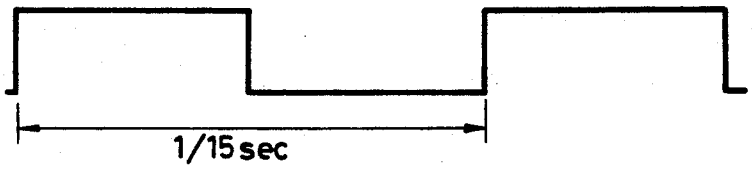
1/15 sec
FIG. 2(e) HEAD
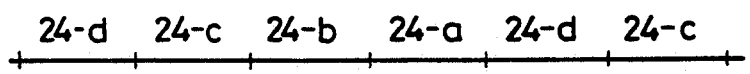
24-d  24-c  24-b  24-a  24-d  24-c

FOUR HEAD SEQUENTIAL SWITCH SCANNING TYPE MAGNETIC RECORDING/REPRODUCING APPARATUS

This application is a continuation of application Ser. No. 478,713, filed Feb. 8, 1990, now abandoned, which is a continuation of application Ser. No. 061,312, filed Jun. 12, 1987, now abandoned.

BACKGROUND OF THE INVENTION

This invention relates to a 4-head sequential switch scanning type magnetic recording/reproducing apparatus for recording and reproducing video signals.

Remarkable progress has been made in recent years in reduction of the size of magnetic recording/reproducing apparatuses for recording and reproducing video signals (hereinafter referred to as "VTRs") and compact, light-weight and portable VTRs with a built-in video camera have been developed in the standards using a ½ in.-wide magnetic tape.

VTRs of this type are disclosed, for example, in Japanese Patent Publication No. 20403/1970. In accordance with this prior art reference, a magnetic tape is wound helically around about ¾ of the periphery of a cylinder to which four heads are mounted with spacings of 90° between them and the number of revolution of the cylinder is set to be 3/2 times that of an ordinary 2-head type VTR so that the tape is sequentially scanned by each head to record or reproduce video signals. This recording/reproducing system is referred to as a "4-head sequential switch scanning system", and provides the advantage that the cylinder diameter can be reduced to ⅔ of the ordinary 2-head type VTRs and the system can be made compact.

Therefore, the system is extremely suitable for VTRs with a built-in video camera which are carried around outdoors for recording and reproduction.

Incidentally, when recording or reproduction of the tape is made by the heads, the tape travels while generally being oscillated. This vibration results from vibration of the outer peripheral surface of the rotary cylinder, the projecting quantity of the heads from the rotary cylinder and the shapes of the projecting portions, the fitting positions of the heads to the rotary cylinder, imbalance of the inertial mass of the rotary cylinder at the rotating position, distortion of the rotary axis of the rotary cylinder, and so forth. In addition, non uniform rotation of the rotary cylinder occurs due to the ripple of a motor. If video signals are recorded on the tape which travels while being oscillated as described above by the heads which are mounted to the rotary cylinder having by itself non-uniform rotation, the signals thus recorded have come to possess a time base strain having the number of revolution of the rotary cylinder as the fundamental frequency.

FIG. 10 is a waveform diagram showing the time base strain in the recording and reproducing modes when the recording head and the reproducing head are the same for each track as will be described elsewhere. In this diagram solid line a represents the relationship between a scanning time t and the time base strain δ of the signal recorded on the tape. Signals having such a time base strain are scanned and recorded on the tape by each head.

The time base strain resulting from the revolution of the cylinder is in synchronism with the phase of revolution of the cylinder. Therefore, it has substantially the same amplitude and phase characteristics in the recording and reproducing modes. When each track is scanned and reproduced by the same head as in the recording mode, the time base strain occurs in substantially the same way as in the recording mode as represented by dash line b in the diagram so that the time base strain in the recording mode is offset and the time base strain of the reproduced video signal falls to a very low level.

An azimuth recording system has been employed for ordinary 2-head type VTRs and each head is subject to a servo-mechanism in such a manner as to reproduce and travel the track which is in conformity with its azimuth angle. For this reason, the head used in the recording mode for each track is the same as the head in the reproducing mode and the level of the time base strain of the reproduced video signal is very low. In other words, the time base strain can be eliminated sufficiently by signal processing.

In the 4-head sequential switch scanning type VTRs, however, the azimuth angles of the two heads which are adjacent to each other with the 90° spacing between them are different, but the azimuth angles of the two heads facing each other with the 180° spacing between them are equal to each other. Therefore, every other track formed on the tape is formed sequentially by the head having the same azimuth angle.

Accordingly, since conventional VTRs employ a servo-mechanism so that each head reproduces and scans the track which is in conformity with the azimuth angle of the head, the track on the tape is sometimes reproduced and scanned by a different head which faces the head used for recording at 180° but has the same azimuth angle. In such a case, the phase of rotation of the rotary cylinder in the reproducing mode comes to be inversed by 180° with respect to the phase in the recording mode As shown in FIG. 11 which is a characteristic diagram showing the time base strain when the recording head and the reproducing head are different for each track as will be described elsewhere, the time base strain in the recording mode due to the rotation of the rotary head has a phase represented by dash line b which is different by 180° from the phase of the time base strain in the recording mode represented by solid line a. The time base strain of the reproduced video signal corresponds to the difference between these time base strains a and b and hence becomes an extremely high level.

It is very difficult to sufficiently eliminate the time base strain of the reproduced video signal occurring in the manner described above by signal processing, so that jitter and color non-uniformity develop on the reproduced picture and quality of the reproduced picture is extremely deteriorated.

FIG. 12 shows an example of measured jitter frequency distribution of reproduced video signals. Solid line in the drawing represents the case where the head for scanning each track is the same in both recording and reproducing modes and dash line represents the case where the head is different. It can be understood from t he diagram that deterioration of the number of revolution of the rotary cylinder and its higher harmonic components is remarkable when the head is different in the recording and reproducing modes.

SUMMARY OF THE INVENTION

It is therefore an object of the present invention to provide a 4-head sequential switch scanning type magnetic recording/reproducing apparatus which eliminates the aforementioned problem of the prior art and can drastically reduce time base strain of reproduced video signals.

To accomplish the object described above, the present invention records the video signal on each track of the tape in each one field period and records also a tracking control signal which is different from track to track so that in a reproducing mode where the four heads sequentially scan and reproduce corresponding tracks, the frequency of the reference signal is made different whenever the reproducing heads are switched so that the head in the reproducing mode can obtain the reference signal having the same frequency as the frequency of the tracking control signal which is recorded simultaneously when the reproducing head was in the recording mode, and a servo signal is generated from the reference signal and the reproduced tracking control signal.

A servo mechanism operates in accordance with the servo signal described above so that the frequency of the reproduced tracking control signal is in agreement with the frequency of the reference signal. Therefore, the servo system gets stabilized when the frequencies of both signals are in agreement with each other, and each track is scanned for reproduction by the same head as the head used in the recording mode.

BRIEF DESCRIPTION OF THE DRAWINGS

Both FIGS. 1(a) and 1(b) are a block diagram showing a magnetic recording/reproducing apparatus in accordance with one embodiment of the present invention, wherein FIG. 1(a) shows a recording system and FIG. 1(b) shows a reproducing system;

FIGS. 2(a), 2(b), 2(c), 2(d), and 2(e), are timing charts showing the relationship between a tack pulses TP, rectangular wave TP' and pluses $P_{30}$, $P_{15}$ in FIG. 1(a);

DESCRIPTION OF THE PREFERRED EMBODIMENTS

Hereinafter, some preferred embodiments of the present invention will be described with reference to the accompanying drawings.

Figure 1A:
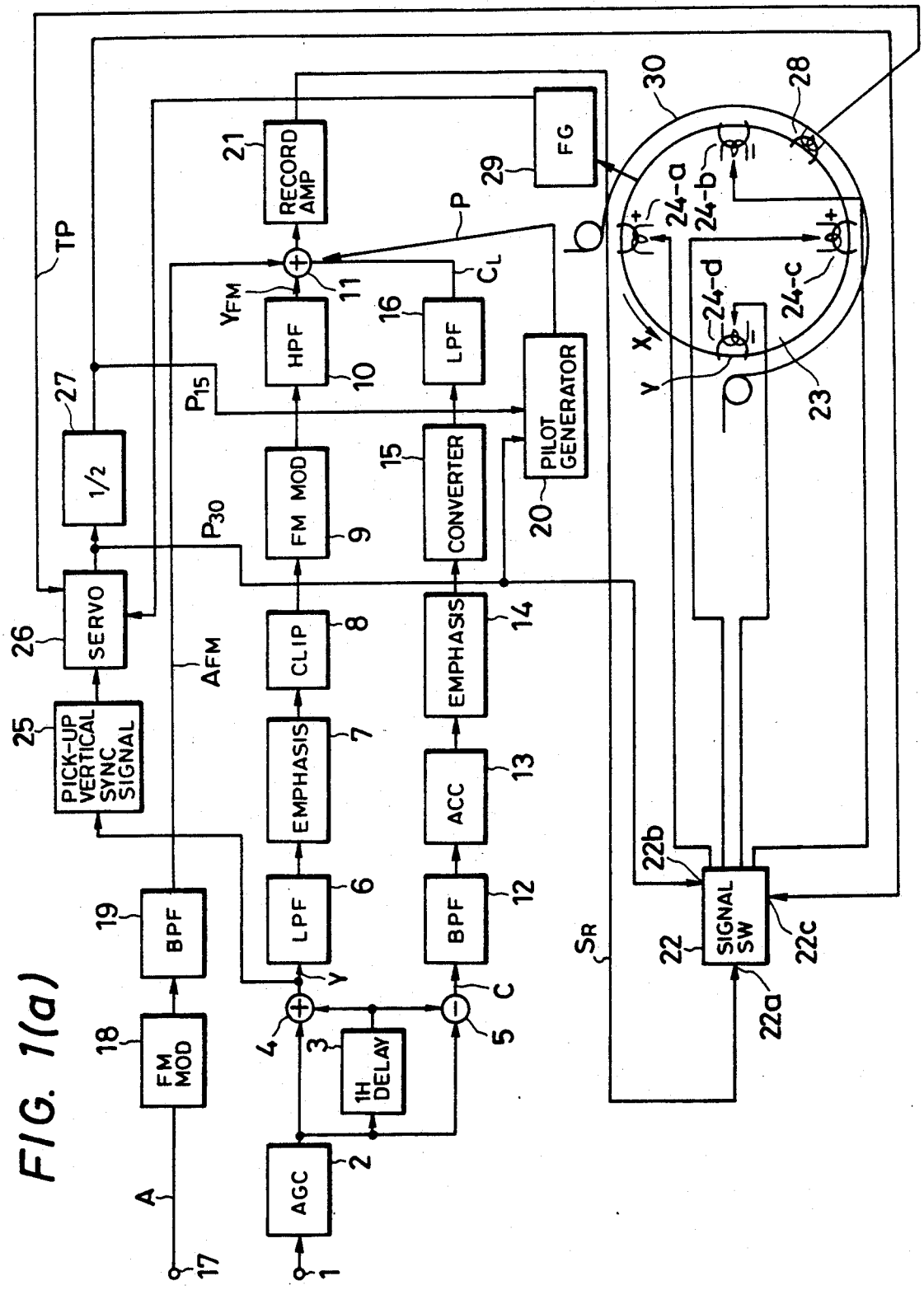
Figure 1B:
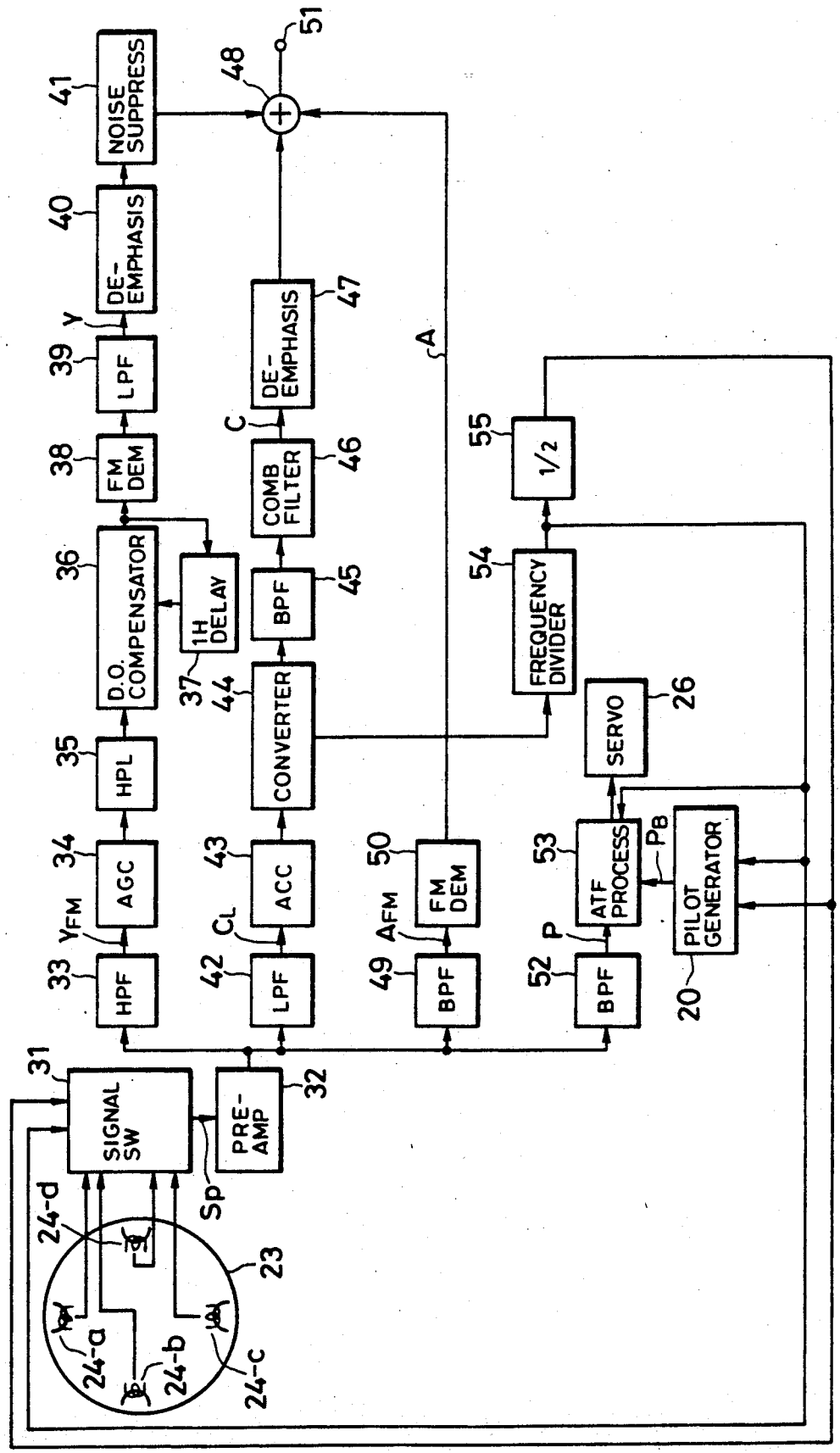

FIG. 1(a) is a block diagram showing a recording system in a magnetic recording/reproducing apparatus in accordance with one embodiment of the present invention and FIG. 1(b) shows its reproducing system. In the drawings, reference numeral 1 represents an input terminal of video signals; 2 is an AGC circuit; 3 is an IH delay circuit; 4 is an addition circuit; 5 is a subtraction circuit; 6 is an LPF; 7 is an emphasis circuit; 8 is a clip circuit; 9 is an FM modulation circuit; 10 is an HPF; 11 is an addition circuit; 12 is a BPF; 13 is an ACC circuit; 14 is an emphasis circuit; 15 is a frequency convertor; 16 is an LPF; 16 is an input terminal of an audio signal; 18 is an FM modulation circuit; 18 is a BPF; 20 is a pilot generator; 21 is a recording amplifier; 22 is a signal switch circuit; 23 is a rotary cylinder; 24-a, 24-b, 24-c and 24-d are heads, 25 is a vertical sync pickup circuit; 26 is a servo circuit; 27 is a ½ frequency divider; 28 is a tach head; 29 is an FG (frequency generator); 31 is a signal switch circuit; 32 is a pre-amplifier; 33 is an HPF; 34 is an AGC circuit; 35 is an HPL; 36 is a DO compensation circuit; 37 is an IH delay circuit; 38 is an FM demodulation circuit; 39 is an LPF; 40 is a deemphasis circuit; 41 is a noise suppression circuit; 42 is an LPF; 43 is an ACC circuit; 44 is a frequency convertor; 45 is a BPF; 46 is a comb filter; 47 is a de-emphasis circuit; 48 is an addition circuit; 49 is a BPF; 50 is an FM demodulation circuit; 51 is an output terminal; 52 is a BPF; 53 is an ATF processing circuit; 54 is a frequency divider; and 55 is a ½ frequency divider.

First of all, the recording system will be described.

In FIG. 1(a) the video signal inputted through the input terminal is aligned to a predetermined level by the AGC circuit 2 and then separated to a luminance signal Y and a chrominance signal C by a YC separation circuit consisting of the IH delay circuit 3, the addition circuit 4 and the subtraction circuit 5. After its band is limited by LPF (low-pass filter) 6, the luminance signal Y is applied to the emphasis circuit 7 and the clip circuit 8, where predetermined signal processing is effected. After this signal processing, the luminance signal Y is subjected to FM modulation by the FM modulator 9. The lower band of the FM luminance signal $Y_{FM}$ is limited by HPF (high-pass filter) 10 in order to secure the bands for a low band conversion chrominance signal $C_L$ and an FM audio signal $A_{FM}$, and the FM luminance signal is applied to the addition circuit 11.

On the other hand, the chrominance signal C separated by the YC separation circuit is subjected to band limitation by BPF (band-pass filter) 12 and then to level control by the ACC (automatic chrominance control) circuit 13 in order to align the color burst levels to a predetermined level. The emphasis circuit 14 emphasizes the side band of the chrominance signal C outputted from the ACC circuit 13, and the frequency convertor 15 effects low band conversion. The upper side band of this low band conversion chrominance signal $C_L$ outputted from this frequency convertor 15 which leaks into the band of the FM audio signal $A_{FM}$ is suppressed by LPF 16 and the chrominance signal $C_L$ is then supplied to the addition circuit 11.

The audio signal A inputted from the input terminal 17 is modulated to the FM audio signal $A_{FM}$ by the FM modulation circuit 18 and after its band is limited by BPF (band-pass filter 19), is then applied to the addition circuit 11.

The pilot generator 20 generates a 4-frequency pilot signal P as a tracking control signal, which is applied to the addition circuit 11.

The addition circuit 11 adds the FM luminance signal $Y_{FM}$, the low band conversion chrominance signal $C_L$, the pilot signal P and the FM audio signal $A_{FM}$ and its addition output signal is amplified as a recording signal by the amplifier 21 and then applied to the signal switch circuit 22.

On the other hand, four heads 24-a, 24-b, 24-c and 24-d are disposed on the outer circumference of the rotary cylinder 23 with 90° spacings between them. The heads 24-d and 24-b that are disposed with the 180° spacing have the same azimuth angle and the heads 24-a and 24-c having the 180° spacing have also the same azimuth angle. However, the heads 24-d and 24-b and the heads 24-a and 24-c have mutually different azimuth angles, respectively.

The tape travels helically around about ¾ of the circumference of this rotary cylinder 33 and each head 24-a, 24-b, 24-c, 24-d scans this tape 30. The rotary cylinder 23 rotates by ¾ in each one-field period of the video signal from the input terminal 10.

Rotary transformers (not shown) are disposed between the signal switch circuit 22 and each of the heads 24-a to 24-d and supply the recording signals $S_R$ from the recording amplifier 21 in each field to the heads 24-a, 24-d, 24-c, 24-b in order named whenever the rotary cylinder 23 rotates by ¾. Accordingly, the one-field recording tracks are formed sequentially on the tape 30.

The tach head 28 and FG 29 are disposed on the rotary cylinder 23. The tach head 28 generates a tach pulse TP representing the phase of rotation of the rotary cylinder 23 while FG 29 generates an FG signal in response to the rotary speed of the rotary cylinder 23. These tach pulse TP and FG signal and the vertical sync signal which is picked up from the luminance signal Y by the vertical sync pickup circuit 25 are supplied to the servo circuit 26. This servo circuit 26 controls the phase of the rotary cylinder 23 so that its phase is in synchronism with the vertical sync signal of the luminance signal Y and the rotary cylinder 23 rotates by ¾ in the field (or at 45 Hz).

It will be assumed hereby that the rotary cylinder 23 rotates in the direction represented by arrow X, the signal $S_R$ is supplied from the signal switch circuit 22 to the head 24-d at the point Y, where the head starts scanning the tape 30, and the head 24-d starts recording. Then, this head 24-d records the recording signals $S_R$ of one field in about ¾ round of the rotary cylinder Next, the recording signal $S_R$ is supplied to the head 24-c, which reaches the point Y, and this head 24-c records the next one field in about ¾ round of the rotary cylinder Similarly, the heads 24-b and 24-a record the recording signals $S_R$ one field by one on the tape 30 and this recording operation is repeated.

Signal distribution of the signal switch circuit 22 to each head 24-a to 24-d is controlled by the 30 Hz pulse $P_{30}$ generated by the servo circuit 26 and by the 15 Hz pulse $P_{15}$ from the ½ frequency divider 27 which halves the 30 Hz pulse $P_{30}$.

The tach pulse TP outputted from the tach head 28 is a 45 Hz pulse. Therefore, assuming that the tack pulse TP is generated when the head 24-d reaches the point Y at a certain timing by the phase control described above, this tach pulse TP is generated whenever the rotary cylinder 23 rotates once and the timing at which the head 24-d reaches the point Y for each rotation of the rotary cylinder 23 (that is, for each period of the tach pulse TP) is in agreement with the generation timing of the tach pulse TP.

This tach pulse TP is supplied to the servo circuit 26, and wave-shaped to a 45 Hz rectangular wave TP' as shown in FIG. 2, and the frequency is multiplied by ⅔ times by a doubling circuit and a ⅓ frequency divider disposed in the servo circuit 26, thereby forming a 30 Hz pulse $P_{30}$. Every other rise edge of this pulse $P_{30}$ is in conformity with the timing at which the head 24-d reaches the point Y every three rotations. This pulse and the vertical sync signal from the vertical sync pickup circuit 25 together control the rotation phase of the rotary cylinder 23. This pulse $P_{30}$ is supplied to the input terminal 22-b of the signal switch circuit 22 to form a 15 Hz pulse $P_{15}$, which is supplied to the input terminal 22-c of the signal switch circuit 22. The rise edge of this pulse $P_{15}$ is in conformity with the timing at which the head 24-d reaches the point Y in every three rotations of the rotary cylinder 23.

These pulses $P_{30}$ and $P_{15}$ switch the heads to which recording signals $S_R$ are supplied, and the relationship between the pulses $P_{30}$, $P_{15}$ and the heads to which the recording signals $S_R$ are supplied is tabulated below.

TABLE 1

| Pulse $P_{30}$ | Pulse $P_{15}$ | Recording Heads |
| --- | --- | --- |
| H | H | 24-d |
| L | H | 24-c |
| H | L | 24-b |
| L | L | 24-a |

Note: H ... high level, L ... low level

Figure 3:
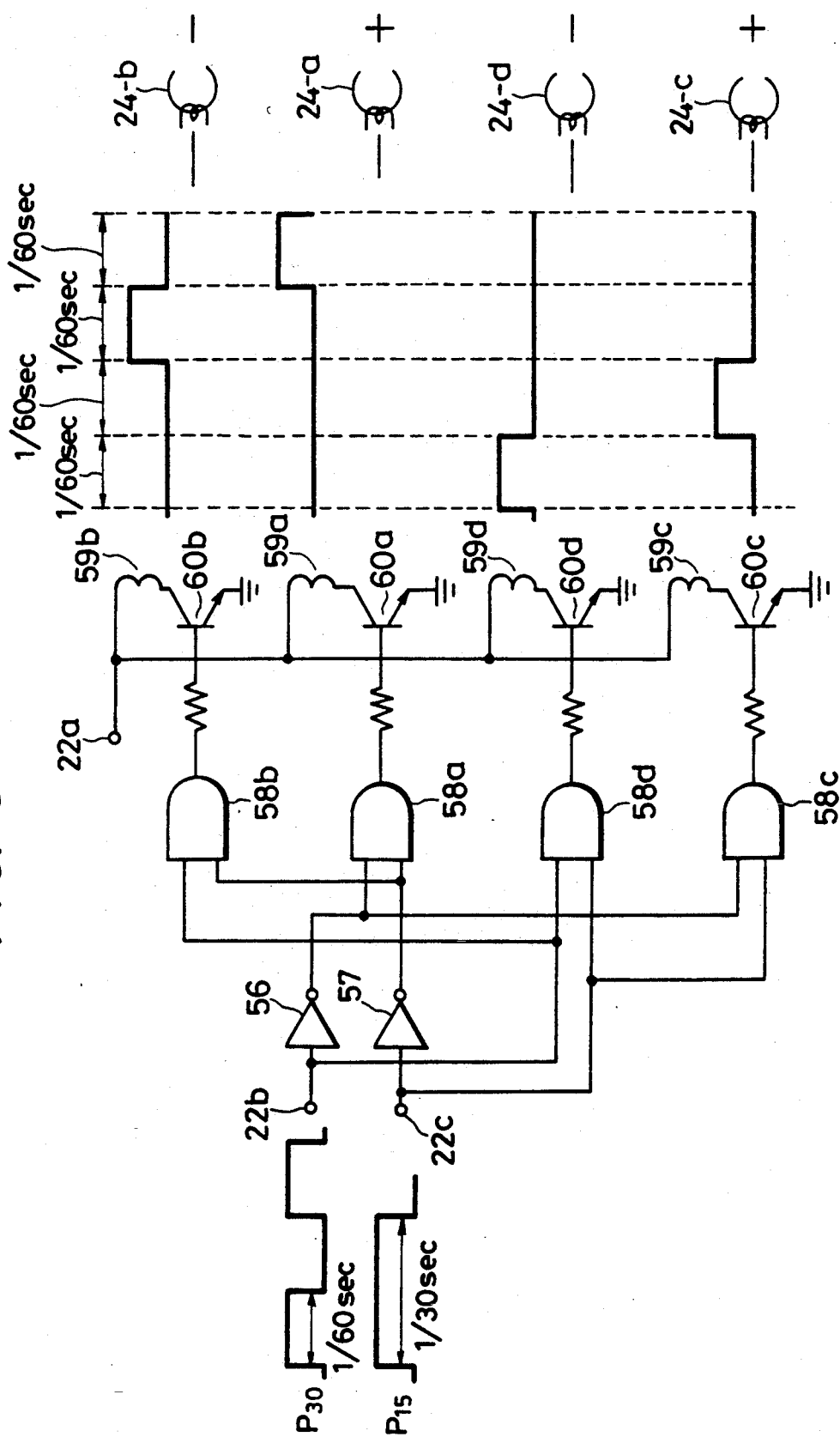
FIG. 3 is a circuit diagram showing one definite example of a signal switch circuit in FIG. 1(a)

FIG. 3 is a circuit diagram showing one definite example of the signal switch circuit 22 in FIG. 1(a).

In FIG. 3, the pulse $P_{30}$ from the input terminal 22-b is directly supplied to AND circuits 58-b, 58-d, inversed by an invertor 56 and then supplied to AND circuits 58-a, 58-c. The pulse $P_{15}$ from the input terminal 22-c is directly supplied to the AND circuits 58-d, 58-c, inversed by the invertor 57 and then supplied to the AND circuits 58-a, 58-b. On the other hand, one end each of the stator side coils 59-a, 59-b, 59-c, 59-d connected to the heads 24-a, 24-b, 24-c, 24-d, respectively, is connected to the input terminal 22-a to which the recording signal $S_R$ is inputted, while the other end is connected to each of the transistors 60-a through 60-d. These transistors are subjected to ON/OFF control by the AND circuits 58-a to 58-d, respectively.

Now, when both the pulses $P_{30}$ and $P_{15}$ are "H", the output signal of the AND circuit 58-d is "H", the transistor 60-d is ON and the recording signal $S_R$ is supplied to the coil 59-d. The period in which both the pulses $P_{30}$ and $P_{15}$ are "H" is 1/60 sec and during this period the recording signals $S_R$ for one field period are supplied to and recorded by the head 24-d. Next, when the pulse $P_{30}$ changes to "L" with the pulse $P_{15}$ remaining "H", the output signal of the AND circuit 58-c is "H", the transistor 60-c is ON and the recording signal $S_R$ is supplied to the coil 59-c. Therefore, the head 24-c records the recording signals $S_R$ of the one field period. Similarly, the transistor 60-b is next ON and the head 24-b records the recording signals $S_R$ of the one field period. Finally, the transistor 60-a is ON and the head 24-a records the recording signals $S_R$ of the one field period, followed thereafter by repetition of the same operation.

Next, the pilot generator 20 shown in FIG. 1(a) will be explained.

Figure 4:
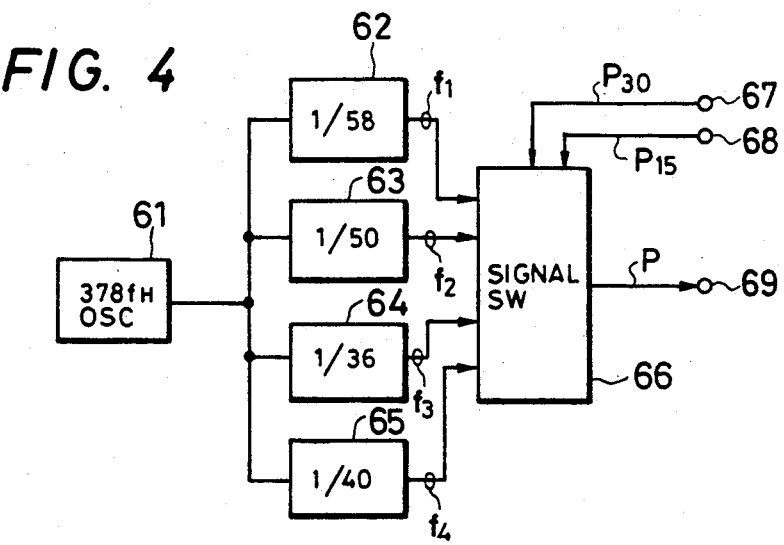
FIG. 4 is a block diagram showing one definite example of a pulse generation circuit in FIG. 1(a)

FIG. 4 is a block diagram showing one definite example of the pilot generator 20. In the diagram, reference numeral 61 represents an oscillator; 62 to 65 are frequency division circuits; 66 is a signal switch circuit; 67 and 68 are input terminals; and 69 is an output terminal.

If the horizontal sync frequency of the video signal is expressed by $f_H$ in the diagram, the oscillator 61 outputs a signal having the frequency 378 $f_H$. This output is supplied to the frequency dividers 62 to 65. These frequency dividers 62 to 65 divide the frequency of the output of the oscillator 61 by 1/58, 1/50, 1/36 and 1/40, respectively, and output the signals having frequency of $f_1$, $f_2$, $f_3$ and $f_4$. Here, $f_1$ to $f_4$ are as follows:

$$f_1 = 6.5 f_H, f_2 = 7.5 f_H$$
$$f_3 = 10.5 f_H, f_4 = 9.5 f_H$$

The signals having these frequencies $f_1$ to $f_4$ are supplied to the signal switch circuit 66 and selected in accordance with the pulses $P_{30}$ and $P_{15}$ supplied from the input terminals 67 and 68, thereby providing the pilot signal P.

Signal switch by the pulses $P_{30}$ and $P_{15}$ in the signal switch circuit 66 is tabulated below.

TABLE 2

| $P_{30}$ | $P_{15}$ | pilot | head |
|---|---|---|---|
| H | H | $f_1$ | 24-d |
| L | H | $f_2$ | 24-c |
| H | L | $f_3$ | 24-b |
| L | L | $f_4$ | 24-a |

Since this signal switch circuit 66 operates by the same pulse $P_{30}$, $P_{15}$ as the signal switch circuit 22 in FIG. 1(a), the frequency of the pilot signal P recorded by the head 24-d is $f_1$ as shown in table above. Similarly, the frequency of the pilot signal P recorded by the head 24-c, 24-b, 24-a is $f_2$, $f_3$, $f_4$.

Figure 5:
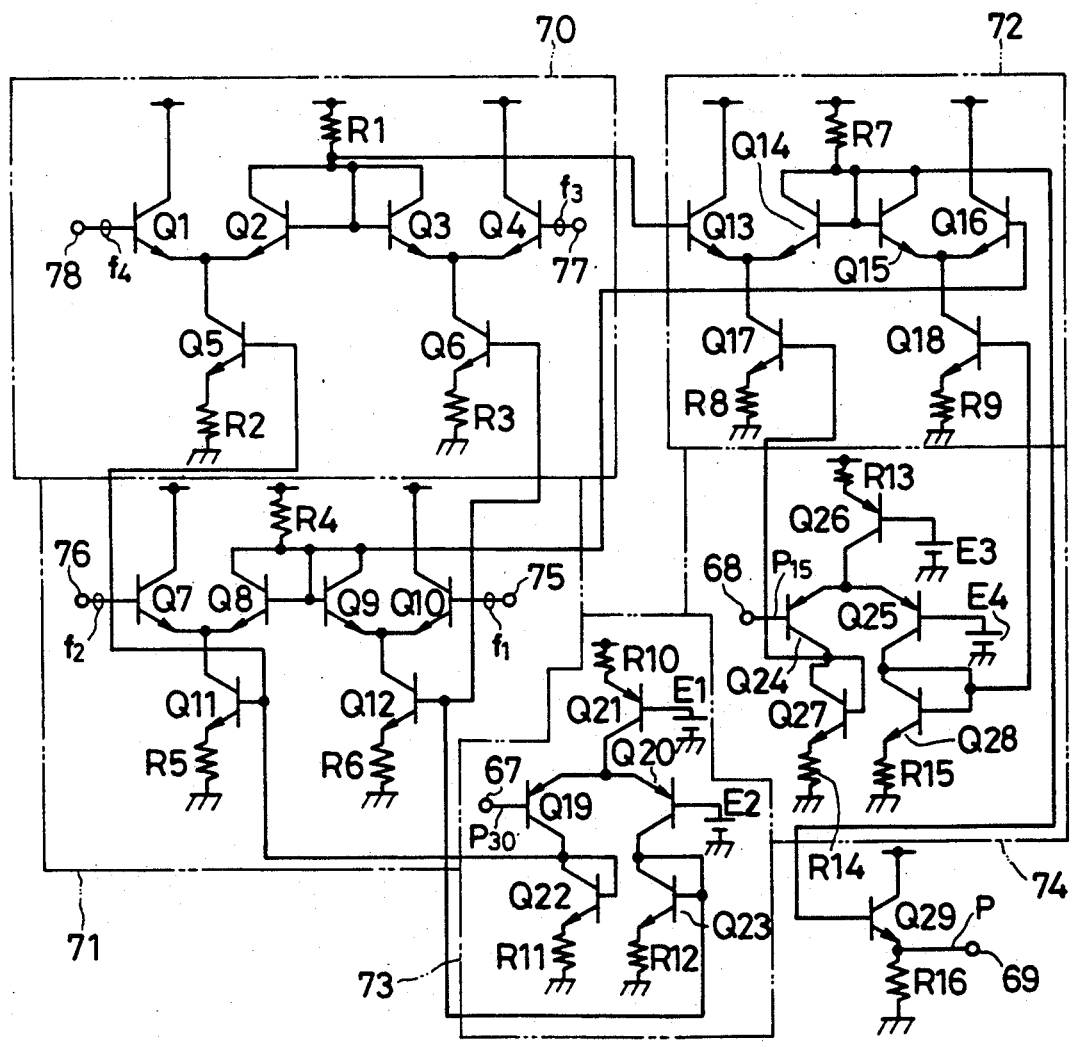
FIG. 5 is a circuit diagram showing one definite example of a signal switch circuit in FIG. 4.

FIG. 5 is a circuit diagram showing one definite example of the signal switch circuit 66 in FIG. 4. Reference numerals 70 to 72 represent switch circuits; 73 and 74 are switch control circuits; 75 to 78 are input terminals; Q1 to Q29 are transistors; R1 to R16 are resistors; and E1 to E4 are constant voltage sources. The portions corresponding to FIG. 4 are identified by like reference numerals.

In FIG. 5, the switch circuit 70 consists of the transistors Q1 to Q6 and the resistors R1 to R3 and switches the signal having the frequency $f_3$ which is supplied from the input terminal 77 (hereinafter referred to the "$f_3$ signal"; hereinafter the same) and the $f_4$ signal supplied from the input terminal 78. The switch circuit 71 consists of the transistors Q7 to Q12 and the resistors R4 to R6 and switches the $f_1$ signal from the input terminal 75 and the $f_2$ signal from the input terminal 76. The switch circuit 72 consists of the transistors 13 to 18 and the resistors R7 to R9 and switches the $f_1$ or $f_2$ signal selected by the switch circuit 71 and the $f_3$ or $f_4$ signal selected by the switch circuit 70.

The switch control circuit 73 consists of the transistors Q19 to Q23, the resistors R10 to R12 and the constant voltage sources E1, E2 and forms the control signals for the switch circuits 70, 71 from the pulse $P_{30}$ from the input terminal 67. The switch control circuit 74 consists of the transistors Q24 to Q28, the resistors R13 to R15 and the constant voltage sources E3, E4 and forms the control signal for the switch circuit 72 from the pulse $P_{15}$ from the input terminal 68.

In the switch control circuit 73, when the pulse $P_{30}$ from the input terminal 67 is "H", the transistors Q19 and Q20 forming a differential pair are OFF and ON, respectively, and a current flows from the constant current source consisting of the resistor R10 and the transistor Q21 through the transistors Q20 and Q23. This transistor Q23, the transistor Q6 of the switch circuit 70 and the transistor Q12 of the switch circuit 71 together constitute a current mirror, and a current having the same value as that of the current flowing through the transistor Q23 flows through these transistors Q6 and Q12. In contrast, since the transistor Q19 is OFF, no current flows through the transistor Q22 which is connected to the emitter of Q19, so that no current flows through the transistor Q5 of the switch circuit 70 and the transistor Q11 of the switch circuit 71 that together constitute the current mirror.

In the switch circuit 70, since the current flows through the transistor Q6, the $f_3$ signal from the input terminal 77 is obtained in the resistor R1 by the transistors Q3 and Q4 that form the differential pair and this signal is supplied to the transistor Q13 of the switch circuit 72 as the output signal of the switch circuit 70. Similarly, the $f_1$ signal from the input terminal 75 is obtained in the resistor R4 by the transistors Q9 and Q10 forming the differential pair and supplied to the transistor Q16 of the switch circuit 72 as the output signal of the switch circuit 71.

When the pulse P is "L", the transistor Q19 is ON while the transistor Q20 is OFF and the current flows through the transistor Q22. Therefore, the current flows through the transistor Q5 of the switch circuit 70 forming the current mirror with the transistor Q22 and the $f_4$ signal from the input terminal 78 is obtained in the resistor R1 by the transistors Q1 and Q2 forming the differential pair. This $f_4$ signal is supplied to the transistor Q13 of the switch circuit 72 as the signal selected by the switch circuit 70. Similarly, the current flows through the transistor Q11 of the switch circuit 71 that forms the current mirror together with the transistor Q22 of the switch control circuit 73 and the $f_2$ signal from the input terminal 76 is selected and applied to the transistor Q16 of the switch circuit 72.

The switch circuit 72 is controlled by the switch control circuit 74. This switch control circuit 74 has exactly the same construction as the switch control circuit 73.

When the pulse $P_{15}$ from the input terminal 68 is "H", the transistors Q24 and Q25 forming the differential pair are OFF and ON, respectively, and the current flows through the transistor Q28 and the transistor Q18 of the switch circuit 72 that together constitute the current mirror. Accordingly, the transistors Q15 and Q16 of the switch circuit forming the differential pair select the output signal of the switch circuit 71 (the $f_1$ signal or the $f_2$ signal). When the pulse $P_{15}$ is "L", on the other hand, the transistors Q24 and Q25 of the switch circuit 74 are ON and OFF, respectively, and the current flows through the transistor Q27 and the transistor Q17 of the switch circuit 72. Therefore, the transistors Q13 and Q14 forming the differential pair in the switch circuit 72 select the output signal of the switch circuit 70 (the $f_3$ signal or the $f_4$ signal).

The output signal of the switch circuit 72 is supplied to the emitter follower consisting of the transistor Q29 and the resistor R16, and the pilot signal P whose frequency is switched to $f_1$, $f_2$, $f_3$ and $f_4$ for each one-field period in response to the pulse $P_{30}$, $P_{15}$ as shown in Table 2 is obtained at the output terminal 69. This pilot signal P is supplied to the addition circuit 11 shown in FIG. 1(a).

Figure 6:
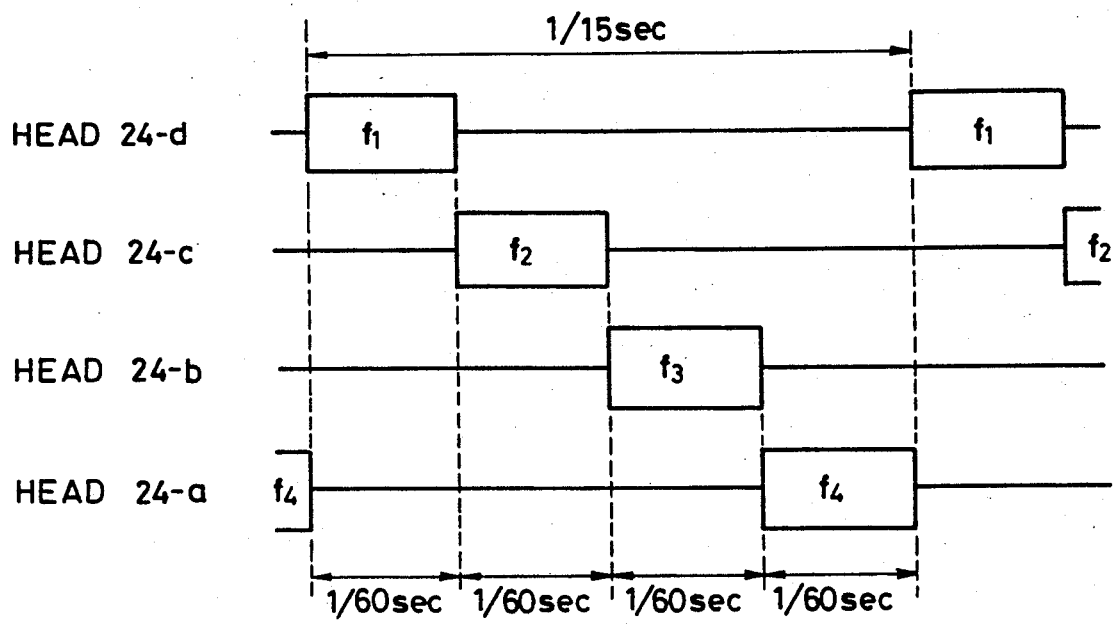
FIG. 6 is an explanatory view showing the frequency of a pilot signal of each head and its supply timing in FIG. 1(a)

FIG. 6 shows the relationship of the supply timing of the pilot signal P to each head 24-a to 24-d.

The pilot signal is supplied to each head 24-a to 24-d in each 1/60 sec (one field) period. When the pilot signal P of the frequency $f_1$ is supplied to the head 24-d in the 1/60 sec period, and the pilot signal P of the frequency $f_2$ is supplied to the head 24-c for the next 1/60 sec period. Furthermore, the pilot signal P of the frequency $f_3$ is supplied to the head 24-b for the subsequent 1/60 sec period and then the pilot signal P of the frequency $f_4$ is supplied to the head 24-a for the next 1/60 sec period.

Figure 7:
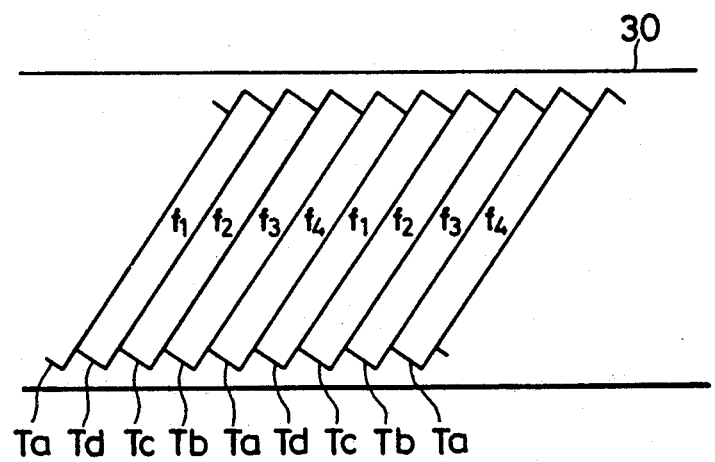
FIG. 7 is a pattern diagram showing the relationship between a track on a tape and the frequency of the pilot signal.

In FIG. 7, therefore, assuming that the tracks formed on the tape 30 by the heads 24-a, 24-b, 24-c and 24-d are Ta, Tb, Tc and Td, respectively, the pilot signal P recorded in the track Td is only the $f_1$ signal. Similarly, the pilot signals P recorded on the tracks Tc, Tb and Ta are only the $f_2$ signal, the $f_3$ signal and the $f_4$ signal, respectively.

It can be understood from above that the head forming a given track on the tape 30 and the frequency of the pilot signal correspond to each other on the 1:1 basis and it becomes possible to identify from the frequency of the pilot signal P recorded on the track which of the heads 24-a to 24-d forms this track.

Incidentally, the frequency $f_1 \sim f_4$ of the pilot signal P is sufficiently lower than the FM luminance signal $Y_{FM}$, the low band conversion chrominance signal $C_L$ and the FM audio signal $A_{FM}$ to be recorded.

Next, the reproducing system shown in FIG. 1(b) will be explained.

In the drawing, the rotary cylinder 23 is controlled in such a manner as to rotate at 45 Hz in the same way as in the recording mode and its phase is controlled by the tach pulse TP from the tach head 28 (shown in FIG. 1(a)) and the pulse $P_{15}$ from the ½ frequency divider 55. The heads 24-a to 24-d mounted to the rotary cylinder 23 sequentially scan and reproduce the signals on the tape 30 and their output signals are sequentially supplied to the signal switch circuit 31 through the rotary transformers inside the rotary cylinder 23 and become the continuous reproduction signals $S_P$. After being amplified by the pre-amplifier 32, the reproduction signal $S_P$ is supplied to HPF 33, LPF 42 and BPFs 49, 52.

The FM luminance signal $Y_{FM}$ is separated from the reproduction signal $S_P$ in HPF 33. The levels of this FM luminance signal $Y_{FM}$ are aligned to a predetermined level by the AGC circuit 34 and processing for preventing the inversion of the frequency spectra is effected by HPL (high-pass limiter circuit) 35. After drop-out is eliminated by the delay FM luminance signal from the 1H delay circuit 37 in the DO (dropout) compensation circuit 36 and the signal is demodulated by the FM demodulator. The noise of the luminance signal Y obtained from the FM demodulator outside the band is removed by LPF 39, the signal is de-emphasized by the de-emphasis circuit and the noise inside the band is removed by the noise suppression circuit 41. Finally, the signal is supplied to the addition circuit 48.

In LPF 42, the low band conversion chrominance signal $C_L$ is separated from the reproduction signal $S_P$. After subjected to the level control by the ACC control circuit 43 so that the burst level is constant, the low band conversion chrominance signal $C_L$ is subjected to high band conversion by the frequency convertor 44. The output signal of this frequency convertor 44 is supplied to BPF 45 and the chrominance signal C of the original band is obtained from this BPF 45. The noise component is removed from this chrominance signal C by the comb filter 46, and the signal is de-emphasized by the de-emphasis circuit 47 and supplied to the addition circuit 48.

Furthermore, the FM audio signal $A_{FM}$ is separated from the reproduction signal $S_P$ in BPF 49. After being demodulated by the FM demodulation circuit 50, this FM audio signal $A_{FM}$ is supplied to the addition circuit 48.

A synthetic signal of the luminance signal Y, the chrominance signal C and the audio signal A is obtained from the addition circuit 48 and outputted from the output terminal 51.

The pilot signal P is separated from the reproduction production signal $S_P$ in BPF 52. This reproduced pilot signal P is processed together with the reference pilot signal $P_B$ from the pilot generation circuit 20 by the ATF processing circuit 53, thereby forming the servo signal for tracking. This servo signal is supplied to the servo circuit 26 to effect tracking servo operations of the heads 24-a to 24-d.

On the other hand, an APC circuit containing a 3.58 MHz reference oscillator is disposed in the frequency convertor 44 and the 3.58 MHz signal from this reference oscillator is supplied to the frequency divider 54 to form the 30 Hz pulse $P_{30}$. This pulse $P_{30}$ is supplied to the ½ frequency divider 55 to form the 15 Hz pulse $P_{15}$. These pulses $P_{30}$ and $P_{15}$ are supplied to the signal switch circuit 31 and to the pilot generation circuit 20 while the pulse $P_{30}$ is supplied to the ATF processing circuit 53, too.

The signal switch circuit 31 has the same construction as one that is shown in FIG. 5. In this case, the pulse $P_{30}$ is supplied from the frequency divider 54 (in FIG. 1(b)) to the input terminal 67 in FIG. 5 and the pulse $P_{15}$ from the ½ frequency divider 55 (in FIG. 1(b)) is supplied to the input terminal 68. The reproduction signals from the heads 24-d (FIG. 1(b)), 24-c (FIG. 1(b)), 24-b (FIG. 1(b)) and 24-a (FIG. 1(b)) are supplied to the input terminals 75, 76, 77 and 78, respectively. Therefore, the relationship between the pulses $P_{30}$, $P_{15}$ and the heads from which the reproduction signal is selected by the signal switch circuit 31 becomes as follows:

TABLE 3

| pulse $P_{30}$ | pulse $P_{15}$ | head to be selected |
|---|---|---|
| H | H | 24-d |
| L | H | 24-c |
| H | L | 24-b |
| L | L | 24-a |

The pilot generation circuit 20 has the circuit construction such as shown in FIGS. 4 and 5. In this case, in FIG. 5, the pulse $P_{30}$ from the frequency divider 54 (FIG. 1(b)) is applied to the input terminal 67 and the pulse $P_{15}$ from the ½ frequency divider 55 (FIG. 1(b)) is applied to the input terminal 68. The circuit arrangement other than the above is the same as in the recording mode. Therefore, the frequency of the reference pilot signal $P_B$ obtained from the pilot generation circuit 20 in FIG. 1(b) changes in response to the pulses $P_{30}$ and $P_{15}$ as shown in the foregoing table 2.

Therefore, in FIG. 1(b), when the signal switch circuit 31 selects the head 24-d, the frequency of the reference pilot signal $P_B$ is $f_1$. Similarly, when the signal switch circuit 31 selects the head 24-c, 24-b or 24-a, the frequency of the reference pilot signal $P_B$ is $f_2$, $f_3$ or $f_4$.

Figure 8:
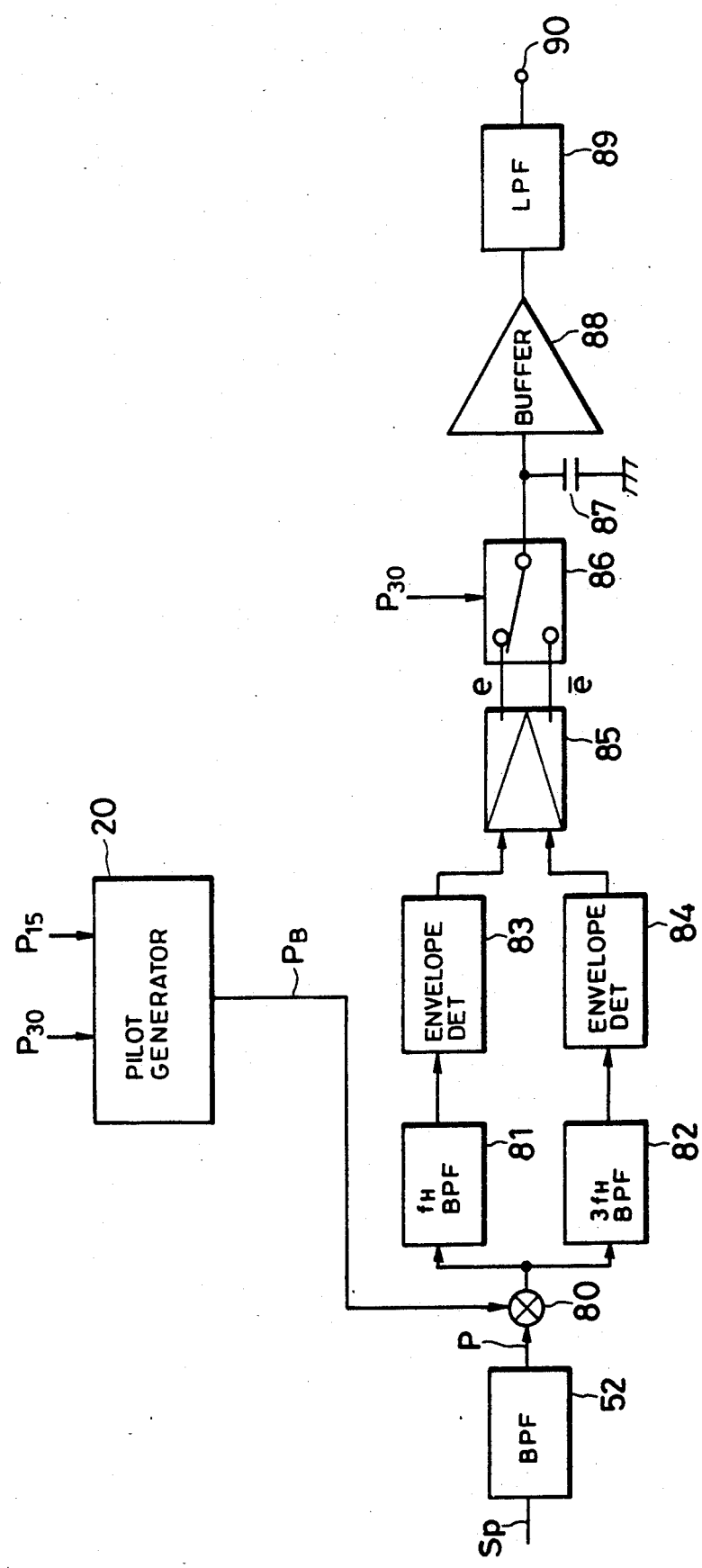
FIG. 8 is a block diagram showing one definite example of an ATF processing circuit in FIG. 1(b)

FIG. 8 is a block diagram showing one definite example of the ATF processing circuit shown in FIG. 1(b). Reference numeral 80 represents a multiplication circuit; 81 and 82 are BPFs; 83 and 84 are envelop detectors; 85 is a differential amplifier; 86 is a switch; 87 is a capacitor; 88 is a buffer; 89 is an LPF; and 90 is an output terminal. The circuit portion corresponding to FIG. 1(b) is represented by like reference numeral.

The reproduced pilot signal P separated by BPF 52 is multiplied by the reference pilot signal $P_B$ from the pilot generator 20 in the multiplication circuit 80 and supplied to BPFs 81 and 82.

In order to attain high density recording free from any card bands between the tracks when recording signals on the tape by the heads, each head records the signals in such a manner as to partially overlap the tracks that have already been formed. For this reason, the width of the track on the tape is smaller than the track width of the head, and when the head scans for reproduction, those tracks (hereinafter referred to as the "adjacent tracks") adjacent to the track as the object of reproduction (hereinafter referred to as the "reproduced track") are also scanned partially for reproduction.

On the other hand, since the azimuth recording system is employed, no signal is reproduced even when the head scans the adjacent tracks for reproduction. However, the frequency of the pilot signal P is so low that no azimuth effect is exhibited and the pilot signal P recorded on the adjacent tracks is reproduced, too. Therefore, in FIG. 8, the pilot signal P separated in BPF 52 is the sum of the pilot signal from the reproduced track and the pilot signal from the adjacent tracks.

The frequency of the pilot signal P recorded on each track of the tape is such as shown in FIG. 7, and the frequencies $f_1$, $f_2$, $f_3$ and $f_4$ are 6.5 $f_H$, 7.5 $f_H$, 10.5 $f_H$ and 9.5 $f_H$ as described already. Therefore, the frequency difference of the pilot signal of the adjacent track to the pilot signal P of the reproduced track is any one of the followings:

$$|f_1 - f_2| = |f_3 - f_4| = f_H$$
$$|f_2 - f_3| = |f_4 - f_1| = 3f_H$$

It will be assumed hereby that each track is scanned for reproduction by the same head as in the recording mode and the reference pilot signal $P_B$ from the pilot generator 20 is in agreement with the frequency of the reproduced pilot signal P from the reproduced track. Then, the output signal of the multiplication circuit 80 contains the signal having the frequency difference $f_H$ between the reproduced track and one of the adjacent tracks (hereinafter referred to as the "$f_H$ signal") and the signal having the frequency difference 3 $f_H$ between the reproduced track and the other of the adjacent tracks (hereinafter referred to as the "3 $f_H$ signal"). The levels of these $f_H$ and $3f_H$ signals correspond to the scanning width of the head for the adjacent tracks and consequently, the level difference of these signals represent the deviation quantity of the head from the reproduced track and the direction of its deviation.

Therefore, the output signal of the multiplication circuit 80 is supplied to BPFs 81 and 82 to separate the $f_H$ signal and the $3f_H$ signal. These signals are detected by the envelop detectors 83 and 84, respectively, and the levels are compared by the differential amplifier 85. The differential amplifier 85 outputs two signals e and $\bar{e}$ whose absolute value is equal to the level difference of these $f_H$ and $3f_H$ signals but whose polarities are different, and these signals are alternately selected by the pulse $P_{30}$ in the switch 86.

Referring to FIG. 7, if the reproduced track is the track Tc, the $3f_H$ signal is obtained by the pilot signal of the right adjacent track and the $f_H$ signal is obtained by the pilot signal P of the left adjacent track. Next, when the reproduced track becomes Tb, the $f_H$ signal is obtained by the pilot signal P of the right adjacent track Ta and the $3f_H$ signal is obtained by the pilot signal P of the left adjacent track Tc. In this manner, whenever the reproduced track changes, the adjacent track providing the $f_H$ and the adjacent track providing the $3f_H$ signal change to the right and left with respect to the reproduced track. Therefore, the differential amplifier 85 outputs the two error signals e and $\bar{e}$ having the mutually opposite polarities and these signals are switched by the switch circuit 86 whenever the reproduced track changes.

It will be assumed hereby that the head is caused to displace to the left in FIG. 7 when the output signal e of the differential amplifier 85 is positive as the difference signal obtained by subtracting the $3f_H$ signal from the $f_H$ is positive and to the right in FIG. 7 when the difference signal is negative, and that when the output signal $\bar{e}$ is the difference signal obtained by subtracting the $f_H$ signal from the $3f_H$ signal, the switch 86 selects the signal e when the pulse $P_{30}$ is "H" (when the heads 24-d and 24-b scan for reproduction from Table 3) and selects the signal $\bar{e}$ when the pulse P is "L" (when the heads 24-c, 24-a scan for reproduction), and the servo operation is applied so that the heads always track correctly the reproduced track.

The error signal from the switch 86 is smoothed by the capacitor 87 and is supplied as the servo signal to the output circuit 26 (FIG. 1(b)) from the output terminal 90 through the buffer 88 and LPF 89.

Next, the operation of FIG. 8 will be described about the case where the track is scanned and reproduced by the head having a different azimuth angle from that of the head used in the recording mode It will be assumed that the head 24 d (FIG. 1(b)) scans and reproduces the track Tc which is formed by the head 24-c.

At this time the frequency of the reference pilot signal $P_H$ from the pilot generator 20 is $f_1$ from Table 2. Since the pulse $P_{30}$ is "H" from Table 2, the switch 86 selects the output signal e of the differential amplifier 85.

Incidentally, the pilot signal P reproduced from the reproduced track Tc is the $f_2$ signal, the pilot signal P reproduced from the right adjacent track Tb is the $f_3$ signal and the pilot signal P reproduced from the left adjacent track Td is the $f_1$ signal. Therefore, the multiplication circuit 80 makes calculation in the following way:

$$|f_2 - f_1| = f_H$$
$$|f_3 - f_1| = 4f_H$$
$$|f_1 - f_1| = 0$$

Therefore, only the difference signal of the frequency $f_H$ between the reproduced pilot signal P from the reproduced track Tc and the reference pilot signal $P_B$ is obtained from BPF 81.

Incidentally, the error signal e selected by the switch 86 is this $f_1$ signal and is positive. Therefore, the head 24-d is caused to displace to the left in FIG. 7 and is subjected to the servo operation so that it is in agreement with the track Td.

Next, when the head 24-d scans and reproduces the track Ta formed by the head 24-a, only the $3f_3$ signal is outputted from only BPF 82 in FIG. 8 and the error signal e selected by the switch 86 is negative. Therefore, the head 24-d is caused to displace to the right in FIG. 7 so as to come into agreement with the track Td.

In this manner, when the head having a different azimuth angle from the head in the recording mode scans and reproduces the track, the head gradually deviates from this track and shifts to the track formed by the head having the same azimuth angle with that of the former.

Next, the operation of FIG. 8 will be described about the case where the track is reproduced and scanned by the head which has the same azimuth angle as, but is different from, the head used in the recording mode.

Here, it will be assumed that the head 24-d scans and reproduces the track Tb formed by the head 24-b in FIG. 7. In this case, too, the frequency of the reference pilot signal $P_B$ from the pilot generator 20 is $f_1$ and the switch 86 selects the output signal e of the differential amplifier 85.

The pilot signal P reproduced by this head 24-b at this time is the $f_3$ signal from the reproduced track Tb, the $f_4$ signal from the right adjacent track Ta and the $f_2$ signal from the left adjacent track Tc. Therefore, the multiplication circuit 80 provides:

$$|f_3 - f_1| = 4f_H$$
$$|f_4 - f_1| = 2f_H$$
$$|f_2 - f_1| = f_H$$

Therefore, the error signal e as the balance between this signal $f_H$ signal and the $3f_H$ signal is obtained from the switch 86.

Incidentally, when the error signal e is positive as described above, the head 24-d is caused to displace to the left and when the error signal is negative, the head is caused to displace to the right as shown in FIG. 7. The adjacent track that generates the $f_H$ signal is the track Tc which is on the left to the reproduced track Tb and on which the $f_2$ signal is recorded, and the adjacent track that generates the $3f_H$ signal is the track Ta which is on the right to the reproduced track and on which the $f_4$ signal is recorded.

Assuming that the head 24-d undergoes displacement towards the left adjacent track Tc, the level of the $f_H$ signal becomes higher than the level of the $3f_H$ signal and the error signal e becomes positive. For this reason, the head 24-d undergoes displacement to the left and along therewith, the level of the $f_H$ signal becomes high while the level of the $3f_H$ signal becomes low so that the head 24-d undergoes displacement all the more to the left. On the contrary, assuming that the head 24-d undergoes displacement towards the right adjacent track Ta, the error signal e becomes negative and hence the head 24-d undergoes displacement all the more to the right.

When the head 24-d scans correctly the reproduced track Tb and the levels of the $f_H$ and $2f_H$ signals are equal to each other, the error signal e becomes zero but at this time, no tracking servo is applied to the head 24-d. Accordingly, the head 24-d is about to undergo displacement either to the right or left. If the head actually undergoes displacement even in a limited quantity, the error signal e is no longer zero and the head deviates from the reproduced track Tb all the more.

This phenomenon occurs for all the tracks when the head which has the same azimuth angle with that of the head used in the recording mode but is different from the latter head that has formed the track scans and reproduces the track.

Therefore, if the head for reproduction and scanning reproduces and scans the track formed by the head having the same azimuth angle but different from the former, this reproducing and scanning head undergoes displacement in such a fashion as to reproduce and scan the tracks adjacent to this reproduced track. However, since the adjacent tracks are formed by the heads having a different azimuth angle from the reproducing and scanning head, the reproducing and scanning head undergoes further displacement in the same direction until finally the reproducing and scanning head tracks the track that has been formed by itself.

In this manner, tracking servo is applied to each head 24-a to 24-d and the deterioration of the reproduced picture resulting from the oscillation of the tape or the non-uniform revolution of the rotary cylinder can be prevented.

Figure 9:
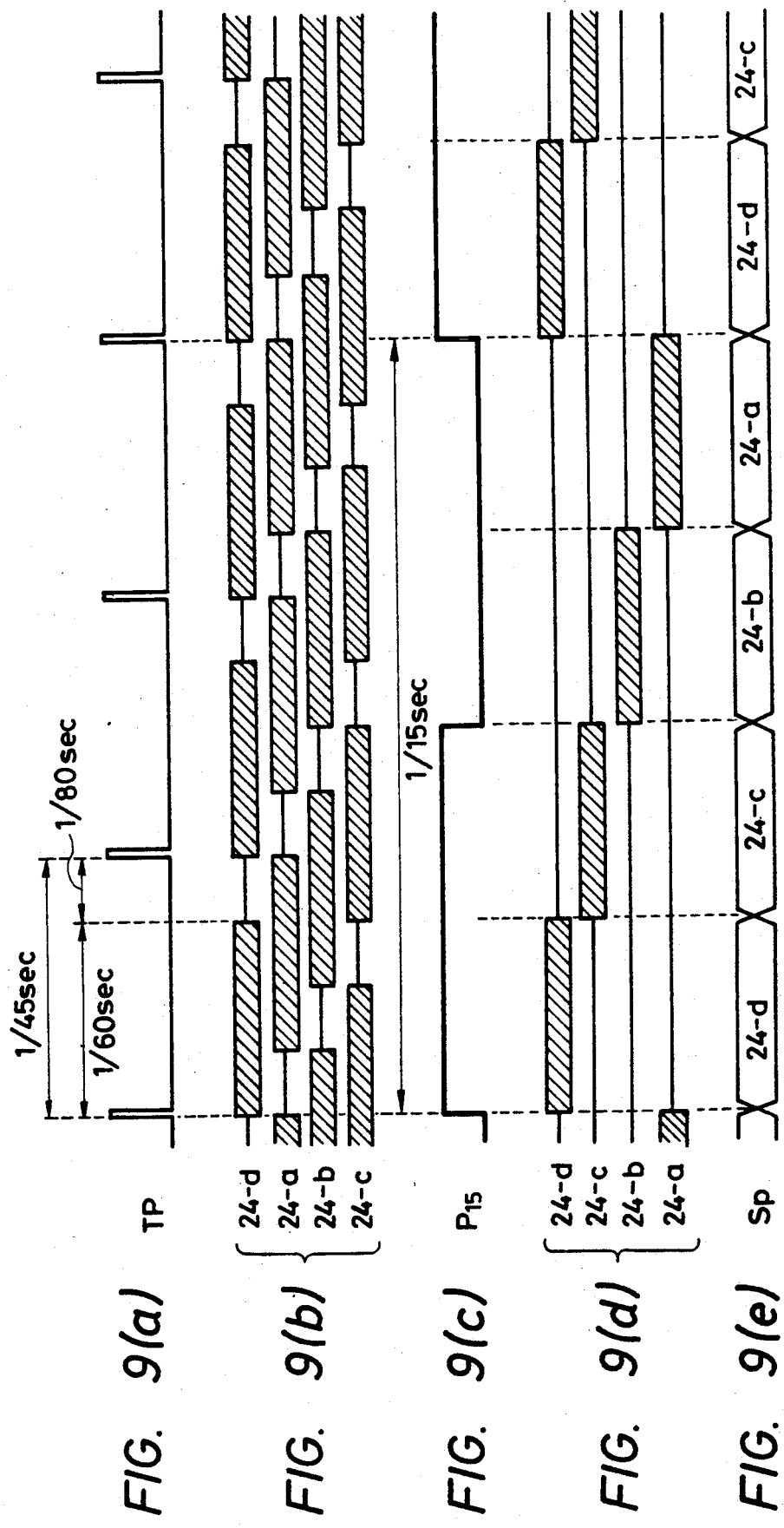
FIGS. 9(a), 9(b), 9(c), 9(d) and 9(e) are timing charts showing the phase control operation of a rotary cylinder and the operation of the signal switch circuit in FIG. 1(b)
Figure 10:
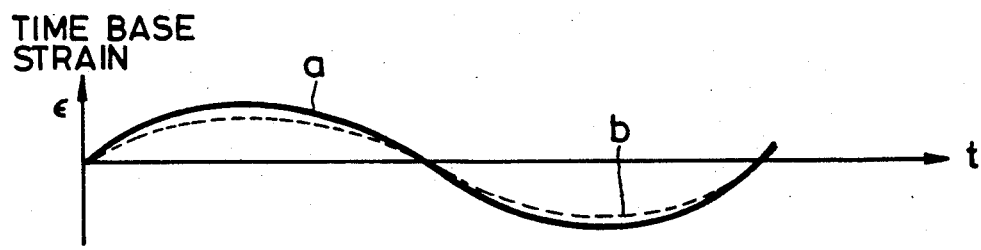
FIG. 10 is a characteristic diagram showing time base strain when a recording head and a reproducing head are the same for each track in recording and reproducing modes.
Figure 11:
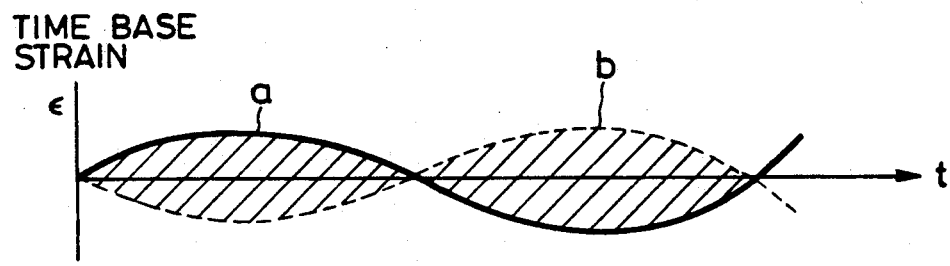
FIG. 11 is a characteristic diagram showing the time base strain in the recording and reproducing modes when the recording head and the reproducing head are different for each track.
Figure 12:
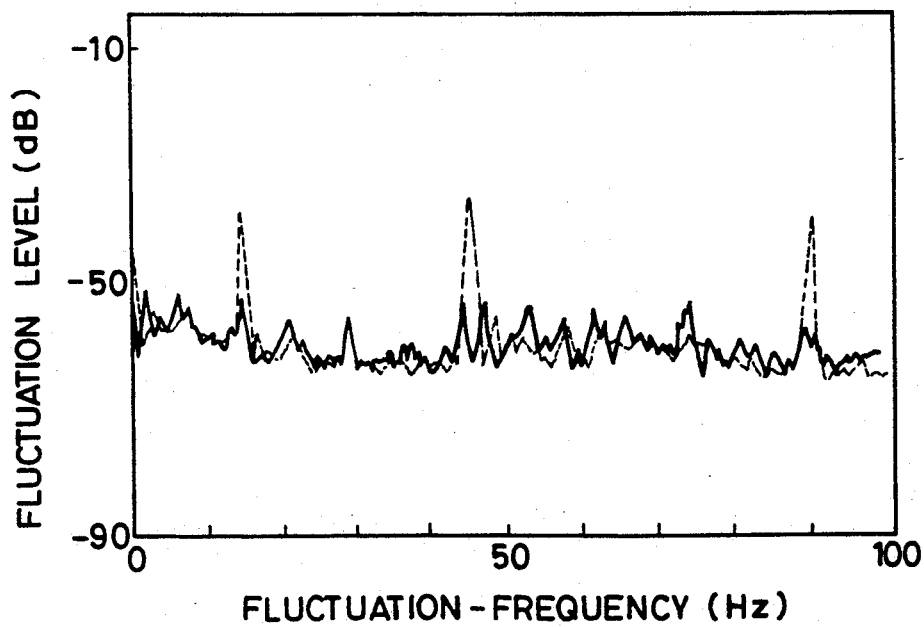
FIG. 12 is a characteristic diagram showing jitter when the recording head and the reproducing heads are the same for each head and when they are different.

Incidentally, though not shown in FIG. 1(b), phase control of the rotary cylinder 23 is made by use of the pulse $P_{15}$ from the ½ frequency divider 55 and the tach pulse TP from the tach head 28 (FIG. 1(a)) disposed on the rotary cylinder 23. In other words, the 15 Hz pulse is formed from the 45 Hz tach pulse in the servo circuit 26 and its phase is compared with that of the pulse $P_{15}$ from the ½ frequency divider 55 to form the phase control signal. The phase control of the rotary cylinder 23 is made by use of this phase control signal. According to this arrangement, the phase of the tach pulse TP is in agreement with that of the pulse $P_{15}$ in every three periods as shown in FIG. 9, the head 24-d starts scanning the tape 30 from the point of generation of the tach pulse TP, the heads 24-a, 24-b and 24-c start sequentially scanning after ¼ rotation of sequentially selects the heads 24-d, 24-c, 24-b and 24-a from the rise of the pulse $P_{15}$ in order named for each 1/60 sec period. Accordingly, each of the heads 24-d to 24-a are correctly selected by the signal switch circuit 31 for the 1/60 sec in which it scans the tape 30.

In this manner, the stable pulse $P_{15}$ is obtained from the stable output signal of the 3.58 MHz oscillator contained in the frequency convertor 44 by the frequency divider 54 and the ½ frequency divider 55 and is used as the reference phase signal for the rotary phase of the rotary cylinder 23. Accordingly, the rotary phase of the rotary cylinder 23 gets stabilized. Under this state, the tracking servo operation is effected for each head and each track is scanned for reproduction by the same head as used in the recording mode.

As described above, when the four heads sequentially record and reproduce the video signals, the present invention makes it possible to scan and reproduce each track by the same head as used in the recording mode and to drastically reduce the time base strain of the reproduced video signals resulting from the oscillation of the tape and the non-uniform rotation of the rotary cylinder. As a result, the present invention can remarkably improve the quality of the reproduced picture.

What is claimed is:

1. In a magnetic recording/reproducing apparatus of the type wherein four heads are mounted with 90° spacings between them on rotary cylinder rotating ¾ round in each one field period of video or audio signals, adjacent pairs of said heads having the 90° spacing having mutually different azimuth angles and opposing pairs of said heads having 180° spacing having mutually the same azimuth angle, a tape wound on said rotary cylinder in about ¾ turn and travelling thereon, said heads recording the video signals in each one field together with a pilot signal for tracking control, and a servo signal for tracking being formed from a reproduced pilot signal and a reference pilot signal, the improvement comprising recording means including generation means for generating four signals having different frequencies corresponding to said four heads and switch means for supplying said four signals having different frequencies to said four heads one by one as a pilot signal of a different frequency when said heads are switched so that each of tracks formed on said tape by each of said heads has a different frequency pilot signal for tracking control, and means for reproducing signals from the recorded tracks including control means for generating reference pilot signals having frequencies corresponding to the frequencies of the pilot signals supplied to the heads for recording, and servo means responsive to the pilot signals reproduced from the recorded tracks and the reference pilot signals for effecting control so that a respective one of said heads used for recording a predetermined track is also utilized to scan and reproduce signals from said predetermined track.

2. A magnetic recording/reproducing apparatus according to claim 1, wherein said generation means includes an oscillator for outputting a signal of 378 $f_H$, where $f_H$ is a horizontal sync signal of the video signal, and four frequency dividers, connected to said oscillator, for dividing the frequency of the output signal of said oscillator by 1/58, 1/50, 1/36 and 1/40 to obtain four signals having frequencies of $f_1=6.5\ f_H$, $f_2=7.5\ f_H$, $f_3=10.5\ f_H$ and $f_4=9.5\ f_H$, respectively, and supplying them to said switch means.

3. A magnetic -recording/reproducing apparatus according to claim 1, wherein said switch means is controlled by a control pulse obtained by dividing the frequency of a tach pulse generated by a tach head mounted to said rotary cylinder and representing the rotary phase of said rotary cylinder, and supplies said four signals having different frequencies to said heads, respectively.

4. A magnetic recording/reproducing apparatus according to claim 3, wherein said control pulse are two pulses $P_{30}$ and $P_{15}$ having frequencies of 30 Hz and 15 Hz, respectively.

5. A magnetic recording/reproducing apparatus according to claim 1, wherein said control means includes reproduction generation means for generating four signals having the same frequency as that of said pilot signal recorded on each track of said tape by said recording means as said reference pilot signals, and reproduction switch means for selecting only the signal having the same frequency as that of said pilot signal reproduced by said head whenever said head for reproduction scanning is switched, as said reference pilot signal.

6. In a magnetic recording/reproducing apparatus of a helical scan type in which at least either one of a video signal and an audio signal and a tracking controlling pilot signal are multiplexed at their frequencies, recorded and reproduced as track loci inclined in sequence on a tape by a rotary head having a plurality of heads with different azimuth angles, the improvement comprising:

rotary head means having four heads in which each of first, second, third and fourth heads is spaced apart from each other by 90° along an outer circumference of a rotary cylinder, azimuth angles of the adjoining heads are made different from each other, and the azimuth angles of the first and third heads, and the second and fourth heads opposite to each other by 180° are made equal to each other;

pilot signal generating means for producing four types of pilot signals including first, second, third and fourth pilot signals having four different frequencies;

supplying means for supplying said first pilot signal to said first head, said second pilot signal to said second head, said third pilot signal to said third head, and said fourth pilot signal to said fourth head, respectively;

recording means for recording said four types of pilot signals with said four heads to a separate track locus of said track loci inclined in sequence;

means for reproducing said fourth types of pilot signals recorded in said separate tracks with said four heads;

means for producing said first pilot signal of the same frequency as that of recording in respect to a reproduced signal reproduced with said first head, said second pilot signal of the same frequency as that of recording in respect to a reproduced signal reproduced with said second head, said third pilot signal of the same frequency as that of recording in respect to a reproduced signal reproduced with said third head, and said fourth pilot signal of the same frequency as that of recording in respect to a reproduced signal reproduced with said fourth head; and means for obtaining respective tracking control signals corresponding to each of said four reproducing signals and for performing a tracking servo in respect to each of said four heads, so that the tracks recorded by each of said four heads are scanned with the same head for recording as the head for reproducing.

7. A magnetic recording/reproducing apparatus according to claim 6, wherein said supplying means is controlled by two pulses of 30 Hz and 15 Hz obtained by frequency dividing a track pulse expressing a rotational phase of said rotary cylinder.

8. A magnetic recording/reproducing apparatus according to claim 7, wherein a winding angle of the tape in respect to said rotary cylinder is about 270°.

9. A magnetic recording/reproducing apparatus according to claim 8, wherein said pilot signal generating means includes an oscillator for outputting a signal of 378 $f_H$, where $f_H$ is a horizontal synchronous signal of a video signal and four frequency dividers connected to said oscillator for dividing an output signal of said oscillator by 1/58, 1/50, 1/36 and 1/40 and supplying four signals having frequencies $f_1$, $f_2$, $f_3$ and $f_4$ comprised of 6.5 $f_H$, 7.5 $f_H$, 10.5 $f_H$ and 9.5 $f_H$ frequency, respectively.

10. A magnetic recording/reproducing apparatus according to claim 7, wherein said pilot signal generating means includes an oscillator for outputting a signal of 378 $f_H$, where $f_H$ is a horizontal synchronous signal of a video signal, and four frequency dividers connected to said oscillator for dividing an output signal of said oscillator by 1/58, 1/50, 1/36 and 1/40 and supplying four signals having frequencies $f_1$, $f_2$, $f_3$ and $f_4$ comprised of 6.5 $f_H$, 7.5 $f_H$, 10.5 $f_H$ and 9.5 $f_H$ frequency, respectively.

11. A magnetic recording/reproducing apparatus according to claim 6, wherein a winding angle of the tape in respect to said rotary cylinder is about 270°.

12. A magnetic recording/reproducing apparatus according to claim 11, wherein said pilot signal generating means includes an oscillator for outputting a signal of 378 $f_H$, where $f_H$ is a horizontal synchronous signal of a video signal, and four frequency dividers connected to said oscillator for dividing an output signal of said oscillator by 1/58, 1/50, 1/36 and 1/40 and supplying four signals having frequencies $f_1$, $f_2$, $f_3$ and $f_4$ comprised of 6.5 $f_H$, 7.5 $f_H$, 10.5 $f_H$ and 9.5 $f_H$ frequency, respectively.

13. A magnetic recording/reproducing apparatus according to claim 6, wherein said pilot signal generating means includes an oscillator for outputting a signal of 378 $f_H$, wherein $f_H$ is a horizontal synchronous signal of a video signal, and four frequency dividers connected to said oscillator for dividing an output signal of said oscillator by 1/58, 1/50, 1/36 and 1/40 and supplying four signal having frequencies $f_1$, $f_2$, $f_3$ and $f_4$ comprised of 6.5 $f_H$, 7.5 $f_H$, 10.5 $f_H$ and 9.5 $f_H$ frequency, respectively.

* * * * *